United States Patent [19]

Wiggins et al.

[11] 4,193,129
[45] Mar. 11, 1980

[54] CHARGING CIRCUIT FOR SONAR SYSTEMS

[75] Inventors: Robert W. Wiggins, Hatboro, Pa.; Kurt L. Ettenhofer, Valencia, Calif.; Jack Bess, Willow Grove, Pa.

[73] Assignee: The United States of America as represented by the Secretary of the Navy, Washington, D.C.

[21] Appl. No.: 645,868

[22] Filed: Jan. 5, 1976

[51] Int. Cl.$^2$ .............................................. G01S 9/66
[52] U.S. Cl. ................................... 367/106; 367/903; 320/22
[58] Field of Search ...................... 340/3 T, 4 R, 5 R; 320/22, 23, 48

[56] References Cited

U.S. PATENT DOCUMENTS

| | | | |
|---|---|---|---|
| 3,159,806 | 12/1964 | Piasecki | 340/3 T |
| 3,387,198 | 6/1968 | Johnson et al. | 320/48 |
| 3,728,608 | 4/1973 | Teich | 320/23 |
| 3,795,817 | 3/1974 | Chambaut | 340/4 R |
| 3,967,232 | 6/1976 | Mills et al. | 340/3 T |

Primary Examiner—Richard A. Farley
Attorney, Agent, or Firm—R. S. Sciascia; Henry Hansen

[57] ABSTRACT

A charging circuit for a helicopter dipped sonar system in which a single cable conducts sonar and command signals in either direction along with a DC charging current from the helicopter to a storage battery in a submersible sensor unit. A multiplexer and power supply in the helicopter respectively provide simultaneous transmission of command data and charging current over a common conductor to the sensor unit. A filter and demultiplexer positioned in the sensor unit passes only the data for control of a sonar transmitter. The storage battery is charged directly from the conductor and a battery charge indication as well as hydrophone information is combined by a multiplexer at the sensor and returned to the helicopter by the common conductor for data display and power supply control.

21 Claims, 6 Drawing Figures

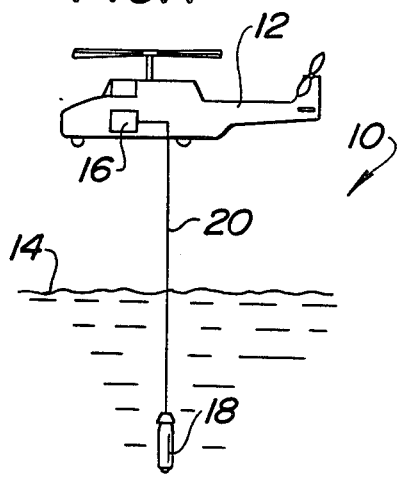
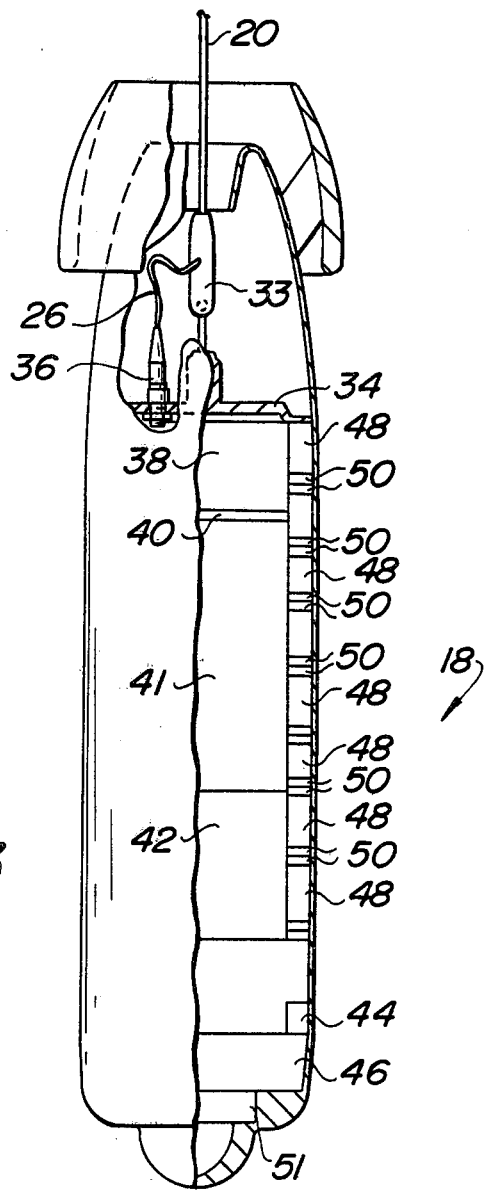
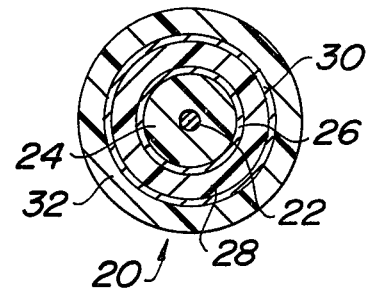
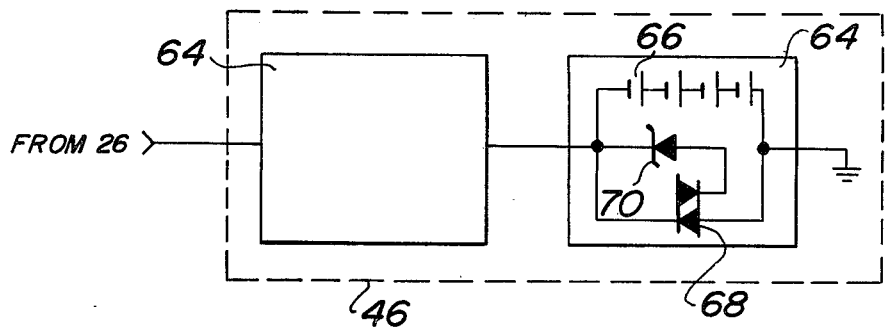

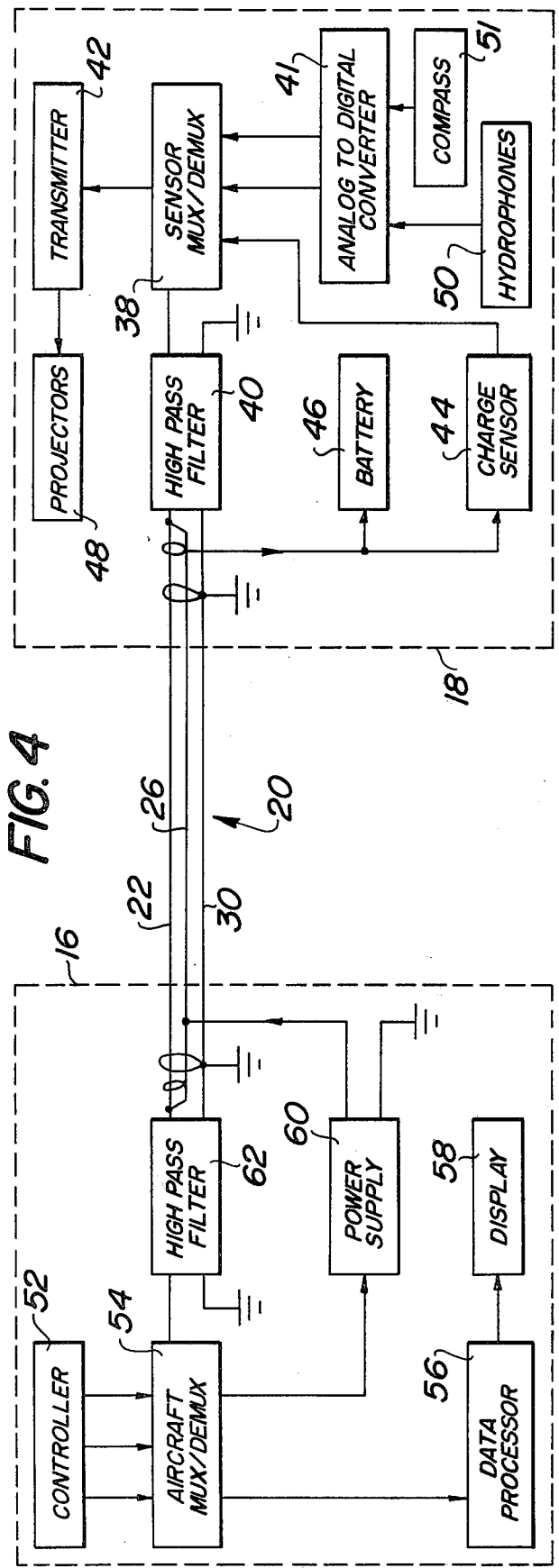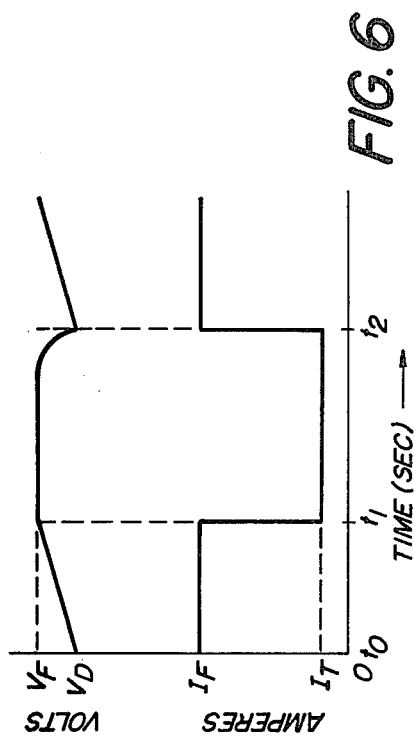

CHARGING CIRCUIT FOR SONAR SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to aircraft or small boat dipped sonar systems and particularly to a single conductor charging circuit and data transmission system which can be effectively employed between an aircraft or small boat and a submersible sonar sensor unit. In operating an aircraft dipped sonar system, it is desirable that performance capabilities of the system be maximized as much as possible with regard to the time period over which the aircraft may hover, the length of cable and consequential depth of sensor operation that can be achieved, the speed with which cable payout and takeup can be accomplished and the number of cables required to pass information between the aircraft and the submersible unit. Prior art dipped sonar systems have utilized multiconductor analog signal processing systems as well as the transmission of a high level transmit pulse down the supporting cable thereby requiring relatively heavy insulation and conductors along the cable length. Moreover, both the cable weight and time required for cable takeup and payout increase proportionally with cable bulk thereby creating an increase in hover periods and a consequential reduction in sensor operating time of the system.

SUMMARY OF THE INVENTION

Accordingly, it is an object of the present invention to provide a helicopter dipped sonar system that can be efficiently operated by the incorporation of a single conductor shielded interconnecting cable. Another object of the invention is to transmit over the aforesaid single conductor cable digital command and data signals between the helicopter and submersible sensor unit as well as a continuous low voltage charging current from the helicopter to the sensor unit. Still another object is to provide for a relatively light weight cable capable of substantially greater length which length will provide for sensor operation at increased water depths not sensitive to seasonal thermoclines. Still another object of the present invention is to decrease the hover period of the launching aircraft due to the increased speed of takeup and payout of a smaller diameter and lighter weight cable.

Briefly, these and other objects are accomplished by a charging circuit for a helicopter dipped sonar system in which a single conductor cable passes sonar and command signals in either direction along with a DC charging current from the helicopter to a storage battery in the submersible sensor unit. A multiplexer and power supply in the helicopter effectively provide simultaneous transmission of command data and charging current over the common conductor to the sensor unit. A filter and demultiplexer at the sensor unit processes only the incoming data for control of the sonar transmitter placed in the sensor. The storage battery is charged directly from the conductor and a sensor monitors the battery voltage to indicate a charged condition. The charge indication as well as hydrophone information is combined in a multiplexer at the sensor and sent to a filter in the helicopter The helicopter filter provides only a data output to a demultiplexer which transmits the sensor information to a data processor for display and for charge current control of the power supply.

For a better understanding of these and other aspects of the invention, reference may be made to the following detailed description taken in conjunction with the accompanying drawings.

BRIEF DESCRIPTION OF THE DRAWINGS

FIG. 1 is a schematic view of a helicopter dipped sonar system according to the present invention;

FIG. 2 is a coaxial cross-section of the single conductor shielded cable illustrated in FIG. 1;

FIG. 3 is a cutaway view of the submerged sensor unit shown in FIG. 1;

FIG. 4 is a block diagram of the electronic and electrical system according to the present invention;

FIG. 5 is a magnified block diagram and schematic representation of the storage battery illustrated in the view of FIG. 3; and FIG. 6 is a graph of the voltage-current relationship of the charging circuit according to the present invention.

DESCRIPTION OF THE PREFERRED EMBODIMENT

Referring now to FIG. 1, there is shown a dipped sonar system 10 having a helicopter 12 hovering over a water surface 14. The helicopter 12 contains an electronics package 16 which is electrically and structurally connected to a submersed sonar sensor unit 18 by an interconnecting cable 20.

FIG. 2 illustrates a coaxial cross-section of the cable 20 wherein a single conductor 22 is coaxially surrounded and insulated by a first dielectric material 24 whose outer surface is covered by a first electrical shield 26. The shield 26, in turn, is coaxially surrounded by a second dielectric material 28 whose outer surface is covered by a second electrical shield 30. The shield 30 is coaxially surrounded by an insulating cable covering 32 which is impervious to water.

Referring now to FIG. 3, there is shown a magnified view of the submersed sensor unit 18 illustrated in FIG. 1 and in which approximately half of the outer skin of the unit 18 has been cut away for better illustration of the more significant components contained therein. A portion of the cable 20 is shown terminated at a cable clamp 33 which is designed to be secured to the end of the second shield 30 within the cable and attaches the end of the cable 20 to a bulkhead 34 positioned toward the rear of the sensor unit 18. The clamp 33 is constructed so to permit the exit of the first shield 26 containing the conductor 22 which is mechanically connected to the bulkhead 34 by a cable connector 36. Centrally positioned within the sensor body 18 and shown in descending order is a sensor dataplexer 38, a high pass filter 40 placed beneath and adjacent to the dataplexer 38, and A/D converter 41, a sonar transmitter 42, a charge sensor 44 and a rechargeable storage battery 46. A plurality of receiving and transmitting transducers are internally and radially arranged about the outer periphery of the sensor unit and, as illustrated in the figure, comprise a series of projector rings 48 alternating with adjacent pairs of hydrophones 50.

Referring now to FIG. 4, there is shown a block diagram of the electronic and electrical circuitry according to the present invention. The electronics package 16, earlier noted as being contained within the helicopter 12 shown in FIG. 1, is shown interconnected by the cable 20 to sensor equipment located within the sensor unit 18 denoted by the dotted lines. The electronic package 16 comprises a controller 52 whose outputs are connected to the input of an aircraft Mux/Demux 54. The Mux/Demux 54 is conventional in construction and has a main input/output line which is used to both receive and transmit serialized digital information. The Mux/Demux 54 provides a demultiplexed output signal to a data processor 56 which coordinates and assembles data to be produced for indication on a display 58. A second demultiplexed output signal indicative of the charge state of the storage battery in the sensor unit 18 is provided between the Mux/Demux 54 and a control input to a power supply 60. The multiplexed data output from the Mux/Demux 54 is connected to a high pass filter 62 whose output is connected in common with the output from the power supply 60. The data output from the filter 62 along with a positive DC charging current from the power supply 60 are commonly connected to the cable center conductor 22 and the cable first shield 26. The outermost and second shield 30 of the cable is utilized primarily for structural support and as cable armor and also to provide a return circuit link for the charging current sent to the sensor unit 18. The cable 20 terminates at the sensor unit 18 wherein the high pass filter 40 is connected to receive the data and charging current sent over the conductor 22 and shield 26, and also the return link to the power supply provided by the shield 30. The output of the filter 40 is connected to an input of the sensor Mux/Demux 38 which, like the aircraft Mux/Demux 54 positioned in the helicopter 12, is capable of receiving and transmitting serial digital data over the same input/output line connected to the filter. The battery 46 is connected to the conductor 22 and the shield 26 in order to receive the charging current from the cable 20. The charge sensor 44 is connected to the battery 46 so as to monitor the voltage therein and to provide an output signal indicative of the battery 46 having reached a predetermined charge or discharge voltage. This output signal is received by the sensor Mux/Demux 38. The Mux/Demux 38 is also connected to receive digital inputs from the A/D converter 41 which is connected to receive analog outputs from the hydrophones 50 and the compass 51. An output signal from the Mux/Demux 38 is connected to the input of the transmitter 42 which provides an output to the projectors 48.

Referring now to FIG. 5, there is shown a magnified view of the battery 46 contained within the sensor unit 18. In this example, the battery 46 is divided into a pair of serially connected battery sections 64 each having therein a series of serially connected battery cells 66. Connected in parallel with the series connected cells 66 is a triac 68 whose control junction is connected to the anode of a zener diode 70 having a cathode which is connected to the common connection of the negatively polarized end of the series connected cells 66 and the cathode of the triac 68. The anode of the triac 68 is connected in common with the positively polarized end of the cells 66 and ground.

For a better understanding of the present invention, the operation thereof will now be explained in conjunction with reference to the drawings. As shown in FIG. 1, the helicopter 12 has paid out through a conventional hoist unit (not shown) the cable 20 having at the terminal end thereof the submersible sensor unit 18. The sensor unit 18 is structurally supported by the armor wire which constitutes the outer shield 30 and which serves as a cable strength member. It is intended that the individual armor wires be galvanized to provide corrosion resistance in the event that sea water penetrates either cuts or abrasions in the cable cover 32. The cable cover may comprise, for example, an extrusion of polypropylene or high density polyethylene having a predetermined thickness. In addition to protecting the armored wires from corrosion and abrasion, the outer cover 32 provides a smooth non-wetting external surface from which the water may readily be wiped as the cable is reeled back into the helicopter 12. As shown in FIG. 3, the cable is terminated at the sensor body 18 by a clamp 33 which picks up the tension load from the armored wires and which separates the conductor 22 and shield 26 from the rest of the cable. Data signals are passed to the equipment within the sensor unit 18 by the connector 36 which, when secured to the bulkhead 34, connects the data signals to the filter 40 and the charging current to the battery 46. In order for the sensor unit 18 to most easily seek a convenient alignment between itself and the support cable 20, the clamp 33 may provide, for example, a universal joint connection between itself and the bulkhead 34 thereby to minimize any kinking or bending within the cable 20.

Due to the relatively high resistance of the center conductor 22 of the cable 20, most of the DC current passing in the cable will flow through the first shield 26. Accordingly, the positive charging current provided by the power supply 60 within the electronics package 16 is connected in parallel with both the center conductor 22 and the shield 26 of the cable 20. The center conductor 22 is in DC parallel with the shield 26 in order that slow transients within the DC current (such as may occur during a transmit cycle) will not cause a large DC voltage to appear between the center conductor and the shield.

Referring now to FIG. 4, the controller 52 is actuated, for example, by the system operator within the helicopter so as to provide command and control output signals to the aircraft Mux/Demux 54. Such signals may comprise, for example, stop and start functions, transmitter power output levels and transmitter frequency control. These output signals are in digital format and are produced by conventional well-known techniques in the art. The Mux/Demux 54 receives the output control signals from the controller 54 and multiplexes this information for output to the high pass filter 62 whose output is connected to the cable 20. Additionally, the power supply 60 provides an output charging current which is hard wired into the parallel combination of the center conductor 22 and the shield 26 of the cable 20. The negative side of the supply 60 as well as the common ground bus of the equipment within the package 16 is connected to the outer shield 30 of the cable 20.

The high pass filter 40 positioned within the sensor unit 18 is connected to receive the cable information from the helicopter and incorporates a bandpass which passes only the multiplexed serial digital data produced by the aircraft Mux/Demux 54. The filtered data is then connected to the input/output terminal of the sensor Mux/Demux 38 which demultiplexes the incoming serial information and applies the command and control signals to the transmitter 42. Upon activation of the transmitter 42, transmit pulses are sent to the projectors 48. The battery 46, which is primarily intended to supply the relatively high power demands of the transmitter 42, receives the charging current from the cable 20 by appropriate connections to the conductor 22 and the shields 26, 30. The battery, for example, may comprise a series of interconnected nickel-cadmium cells which are easily restored over a plurality of charge-discharge cycles. The voltage of the battery 46 is monitored by connections to the charge sensor 44 which may be constructed in any conventional manner known to those skilled in the art and which provides an output pulse indicative of the battery 46 having reached a predetermined full charge voltage $V_F$ or, conversely, no pulse when the battery is depleted to a predetermined discharge voltage $V_D$. The sensor Mux/Demux 38 is connected to receive this indication from the sensor 44 as well as sonar information produced by the hydrophones 50 and bearing information from the compass 51 and combines these sources of information by a conventional multiplexing arrangement to provide an output signal to the filter 40. The filter 40 passes the multiplexed information to its output which is connected to the cable 20 and, more specifically, to the same conductor and shields 22, 26, 30 which had previously conveyed data and charging current down the cable to the sensor body 18. The filter 62 incorporates a bandpass designed to pass only the incoming multiplexed data from the sensor body 18 and effectively blocks passage of any current component produced by the power supply 60. The filtered multiplexed data is then connected to the input/output terminal of the Mux/Demux 54 which demultiplexes the incoming data for further use. The data processor 56 which may comprise, for example, conventional computational units, correlates and prepares the demultiplexed information for output on a conventional display 58 such as may comprise, for example, a cathode ray tube. In addition to the demultiplexed sonar information received from the sensor unit 18, there is also charging circuit control information produced by the sensor 44 which is ultimately demultiplexed by the Mux/Demux 54 and sent to the power supply 60 for control of the charge current produced by the supply 60. For example, upon sensing a fully charged voltage condition $V_F$ in the battery 46, the sensor 44 produces a pulse indication which is ultimately received by the Mux/Demux 54 which then transmits the pulse to the power supply which in turn changes its full current output charges $I_F$ to a constant voltage trickle current $I_T$ in order not to overcharge the battery 46.

Referring now to FIG. 5, there is shown one embodiment of a multicell configuration for the battery 46 shown in FIGS. 3 and 4. Such a configuration consists of a plurality of nickel-cadmium rechargeable cells 66 which are serially connected to form a single section having a battery voltage equivalent to the total voltages of the cells 66 placed in series. Since an open circuited cell within any series would disable the battery 46, the battery sections 64 are bypassed with a zener diode 70. Accordingly, the diode 70 is designed to carry the load current around the open section. Charging of the remaining good sections 64 of the battery is accomplished by the zener conduction of the diode 70. With this arrangement, a shorted or open cell cannot disable the battery 46 for either charge or discharge purposes.

FIG. 6 graphically illustrates the charging current-battery voltage relationship over a sample time period. At $t_0$ the battery 46 is shown at its predetermined discharge voltage $V_D$ which typically may only be a volt or two less then its full charge voltage $V_F$. Consequently, the full charge current $I_F$ is applied to the battery until the full voltage $V_F$ is achieved at $t_1$. At $t_1$ the sensor 44 detects the voltage $V_F$ and transmits a control pulse to the supply 60 which then changes over to producing only a trickle current charge $I_T$. As is known in the art, the ni-cad battery 46 will sustain its full charge voltage $V_F$, even during heavy current drain periods, until a period of rapid discharge occurs at $t_2$ when the battery voltage drops once more to the predetermined discharge voltage $V_D$. This charge-discharge cycle is periodically repeated whenever the sensor unit is in operation.

Thus it may be seen that there has been provided a novel charging circuit for a helicopter dipped sonar system in which a single cable conducts sonar and command signals in either direction along with a DC charging current from the helicopter to the storage battery in a submersible unit. Because a single conductor cable is utilized, savings in weight and bulkiness are accomplished as well as an increase of length in the cable to permit sonar operation at increased depth.

Obviously, many variations and modifications of the invention are possible in light of the above teachings. For example, information such as battery temperature and digital test sequences may be incorporated into the data stream of the present invention while still providing charging of the battery. It is therefore to be understood that within the scope of the appended claims the invention may be practiced otherwise than as specifically described.

What is claimed is:

1. A rechargeable dipped sonar system for an above-water vehicle, comprising, in combination:
    cable means formed to depend from the vehicle for immersion in the water; first bi-directional data transfer means formed to be mounted within the vehicle and electrically connected to one end of said cable means for receiving and transmitting data;
    second bi-directional data transfer means electrically connected to the other end of said cable means for receiving and transmitting said data;
    energy producing means formed to be mounted within the vehicle and electrically connected to said one end of said cable means for generating a charge current thereon; and
    energy storage means electrically connected to said other end of said cable means for receiving and storing the charge current.

2. A sonar system according to claim 1 wherein said first data transfer means further comprises:
    a first filter having an input connected to said one end of said cable means for passing only said data to an output; and
    first data processing means connected to receive said first filter output data for displaying preselected portions thereof at an output.

3. A sonar system according to claim 2 wherein said first data processing means further comprises:
    signal generating means for generating a plurality of control signals and for producing outputs indicative thereof;
    first multiplexing/demultiplexing means connected to receive said signal generating means outputs and said first filter output for multiplexing to control signals for transmission to said second data transfer means and for producing a demultiplexed received data output; and means operatively connected to receive said first multiplexing/demultiplexing output for producing a display thereof.

4. A sonar system according to claim 3 wherein said second data transfer means further comprises:

a second filter having an input connected to said other end of said cable means for passing only said data to an output; and second data processing means connected to receive said second filter output data for displaying preselected portions thereof at an output.

5. A sonar system according to claim 4 wherein said second data processing means further comprises:

hydrophone means for detecting acoustic signals and for producing an output signal indicative thereof;

second multiplexing/demultiplexing means connected to receive said hydrophone means output signal and said second filter output for multiplexing the hydrophone means output signal for transmission to said first data transfer means and for producing a demultiplexed received data output; and transmitting means connected to receive said second multiplexing/demultiplexing means output for transmitting acoustic energy in response thereto.

6. A sonar system according to claim 5 wherein said energy storage means further comprises a plurality of series-connected sectional units, each of said units including a plurality of series-connected battery cells arranged to produce an output voltage equal to the sum of the voltages of all of the respective cells in the series, a triac semiconductor having an anode and cathode connected respectively between the positive and negative voltage terminals of said plurality of series-connected cells and for providing a control junction output, and a zener diode having an anode connected to receive said triac control junction output and a cathode commonly connected to said triac cathode and negative voltage terminal.

7. A sonar system according to claim 6 wherein each of said battery cells is nickel-cadmium.

8. A sonar system according to claim 6 wherein said cable means further comprises:

a center conductor;

a first dielectric coaxially formed about said center conductor;

a first conductive shield coaxially formed about said first dielectric;

a second dielectric coaxially formed about said first shield;

a second conductive shield coaxially formed about said second dielectric; and a dielectric outer covering coaxially formed about said second shield.

9. A sonar system according to claim 8 wherein said cable means center conductor and first shield are electrically connected at each of the respective common ends thereof.

10. A rechargeable dipped sonar system for a hovering aircraft, comprising, in combination:

cable means formed to depend from the aircraft for immersion in the water;

first bi-directional data processing means formed to be mounted within the aircraft and electrically connected to one end of said cable means for receiving and transmitting data;

energy producing means formed to be mounted within the aircraft and connected to receive a preselected portion of said received data from said first processing means for selectively generating in response thereto a full charge current or trickle current at an output, said output being electrically connected to said one end of said cable means;

energy storage means electrically connected to the other end of said cable means for receiving and storing the charge current and for providing an output indicative of the stored current; and second bi-directional data processing means electrically connected to said other end of said cable means and connected to receive said energy storage means output for receiving and transmitting said data.

11. A sonar system according to claim 10 wherein said energy storage means further comprises:

battery means having an input connected to said other end of said cable means for receiving the charge current; and a charge sensor having an input commonly connected to said battery means input for sensing the charge within said battery means and for producing said energy storage means output.

12. A sonar system according to claim 11 wherein said battery means further comprises a plurality of series-connected sectional units, each of said units including a plurality of series-connected battery cells arranged to produce an output voltage equal to the sum of the voltages of all of the respective cells in the series, a triac semiconductor having an anode and cathode connected respectively between the positive and negative voltage terminals of said plurality of series-connected cells and for providing a control junction output, and a zener diode having an anode connected to receive said triac control junction output and a cathode commonly connected to said triac cathode and negative voltage terminal.

13. A sonar system according to claim 12 wherein each of said battery cells is nickel-cadmium.

14. A rechargeable dipped sonar system for an abovewater vehicle, comprising, in combination:

cable means formed to depend from the vehicle for immersion in the water; first bi-directional data transfer means formed to be mounted within the vehicle and electrically connected to one end of said cable means for receiving and transmitting data;

second bi-directional data transfer means electrically connected to the other end of said cable means for receiving and transmitting said data;

energy producing means formed to be mounted within the vehicle and electrically connected to said one end of said cable means for generating a charge current thereon; and energy storage means electrically connected to said other end of said cable means for receiving and storing the charge current, said storage means comprising a plurality of series-connected sectional units, each of said units including a plurality of series-connected battery cells arranged to produce an output voltage equal to the sum of the voltages of all the respective cells in the series, a triac semiconductor having an anode and cathode connected respectively between the positive and negative voltage terminals of said plurality of series-connected cells and for providing a control junction output, and a zener diode having an anode connected to receive said triac control junction output and a cathode commonly connected to said triac cathode and negative voltage terminal.

15. A sonar system according to claim 14 wherein said first data transfer means further comprises:
a first filter having an input connected to said one end of said cable means for passing only said data to an output; and
first data processing means connected to receive said first filter output data for displaying preselected portions thereof at an output.

16. A sonar system according to claim 15 wherein said first data processing means further comprises:
signal generating means for generating a plurality of control signals and for producing outputs indicative thereof;
first multiplexing/demultiplexing means connected to receive said signal generating means outputs and said first filter output for multiplexing the control signals for transmission to said second data transfer means and for producing a demultiplexed received data output; and
means operatively connected to receive said first multiplexing/demultiplexing output for producing a display thereof.

17. A sonar system according to claim 16 wherein said second data transfer means further comprises:
a second filter having an input connected to said other end of said cable means for passing only said data to an output; and
second data processing means connected to receive said second filter output data for displaying preselected portions thereof at an output.

18. A sonar system according to claim 17 wherein said second data processing means further comprises:
hydrophone means for detecting acoustic signals and for producing an output signal indicative thereof;
second multiplexing/demultiplexing means connected to receive said hydrophone means output signal and said second filter output for multiplexing the hydrophone means output signal for transmission to said first data transfer means and for producing a demultiplexed received data output; and
transmitting means connected to receive said second multiplexing/demultiplexing means output for transmitting acoustic energy in response thereto.

19. A sonar system according to claim 14 wherein each of said battery cells is nickel-cadmium.

20. A sonar system according to claim 14 wherein said cable means further comprises:
a center conductor;
a first dielectric coaxially formed about said center conductor;
a first conductive shield coaxially formed about said first dielectric;
a second dielectric coaxially formed about said first shield;
a second conductive shield coaxially formed about said second dielectric; and
a dielectric outer covering coaxially formed about said second shield.

21. A sonar system according to claim 20 wherein said cable means center conductor and first shield are electrically connected at each of the respective common ends thereof.

* * * * *